United States Patent
Ogawa et al.

(10) Patent No.: US 6,859,426 B1
(45) Date of Patent: Feb. 22, 2005

(54) OPTICAL DISK DRIVE UNIT

(75) Inventors: Toshihiro Ogawa, Iruma (JP); Fumio Nagase, Mitaka (JP)

(73) Assignee: Teac Corporation, Tokyo (JP)

( * ) Notice: Subject to any disclaimer, the term of this patent is extended or adjusted under 35 U.S.C. 154(b) by 611 days.

(21) Appl. No.: 09/913,302

(22) PCT Filed: Jul. 18, 2000

(86) PCT No.: PCT/JP00/04820

§ 371 (c)(1),
(2), (4) Date: Aug. 13, 2001

(87) PCT Pub. No.: WO01/15148

PCT Pub. Date: Mar. 1, 2001

(30) Foreign Application Priority Data

Aug. 20, 1999 (JP) .......................................... 11-234199

(51) Int. Cl.[7] .............................................. G11B 7/00
(52) U.S. Cl. ................................................. 369/47.53
(58) Field of Search ............................ 369/47.5, 47.52, 369/53.22, 53.26, 59.11, 59.12, 116, 47.51, 47.53, 53.2, 53.31, 275.3, 13.26, 13.27

(56) References Cited

U.S. PATENT DOCUMENTS

| | | | |
|---|---|---|---|
| 5,134,606 A | | 7/1992 | Sekiguchi et al. |
| 5,226,027 A | * | 7/1993 | Bakx ........................ 369/47.55 |
| 5,303,217 A | * | 4/1994 | Bakx et al. ................ 369/47.53 |
| 5,450,383 A | * | 9/1995 | Call et al. ................. 369/47.52 |
| 5,706,271 A | * | 1/1998 | Hashimoto ................ 369/53.37 |
| 5,737,289 A | | 4/1998 | Udagawa |
| 5,898,655 A | * | 4/1999 | Takahashi ................ 369/47.53 |
| 5,949,747 A | * | 9/1999 | Miyashita et al. ........ 369/53.26 |

FOREIGN PATENT DOCUMENTS

| | | | |
|---|---|---|---|
| EP | 751509 A2 * | 1/1997 | ........... G11B/7/125 |
| JP | 340236 | 2/1991 | |
| JP | 07287847 A | 10/1995 | |
| JP | 08329468 A * | 12/1996 | ............ G11B/7/00 |
| JP | 09212866 A * | 8/1997 | ............ G11B/7/00 |
| JP | 10312568 A | 11/1998 | |
| JP | 2000260048 | 9/2000 | |
| WO | WO9533261 | 12/1995 | |

* cited by examiner

Primary Examiner—Thang V. Tran
Assistant Examiner—Bach Vuong
(74) Attorney, Agent, or Firm—Ladas & Parry LLP

(57) ABSTRACT

An optical disk drive unit performing write power calibration which performs recording on a given test area of an optical disk by changing a write power and sets an optimum write power based on characteristic values obtained from reproduced signals from the given test area includes average calculation means for dividing the given test area into a plurality of areas, performing recording on the areas by changing the write power equally, and calculating averages of characteristic values obtained from reproduced signals from the areas, and optimum write power setting means for setting the optimum write power based on the averages of the characteristic values calculated by the average calculation means. Thereby, with the averages of the characteristic values obtained from the areas of the optical disk which areas are in angularly different positions, the effects of the periodic variation of the optical disk can be reduced and the optimum write power can be set with good accuracy.

10 Claims, 5 Drawing Sheets

OPTICAL DISK DRIVE UNIT

TECHNICAL FIELD

The present invention relates to optical disk drive units, and more particularly to an optical disk drive unit performing calibration of a write laser power.

BACKGROUND ART

Direct-read-after-write optical disks are of write-once and erasable types. Of these types of optical disks, a write-once optical disk may have its data by recording surface made from tellurium (Te) or bismuth (Bi) so that pits are formed thereon by fusing the surface by focusing a laser beam thereon, or made from $Sb_2Se_3$, $TeO_x$ or an organic dye-based thin film so that optical reflectivity is changed by focusing the laser beam on the surface.

A CD-R, which is a write-once optical disk, includes a number of pregrooves for guide purposes. The pregrooves radially wobble slightly at a center frequency of 22.05 kHz. Address information at a time of recording called ATIP (Absolute Time In Pregroove) is FSK-modulated with a maximum deviation of 1 kHz. to be multiplexed and recorded in the pregrooves.

The signal recording format of a CD-R disk includes a power calibration area (PCA) for recording and measuring an optimum write power, a program memory area (PMA) for temporarily recording signal recording information or skip information in a writing process, a lead-in area, a program area, and a lead-out area, which are arranged in an order described from the center of the disk.

With respect to the CD-R disk that is a write-once optical disk, an OPC (Optimum Power Control) operation is performed prior to recording so as to set a laser beam to its optimum write power. For this purpose, the power calibration area includes 100 test areas (partitions) each formed of 15 frames.

Such a setting of the optimum write power is necessary because disks differ in their recording characteristic depending on their manufactures. If the optimum write power of a disk is not obtained, a reproduced signal may have its jitter or error rate considerably worsened in some cases.

According to a conventional method, one write power is assigned to one frame, and recording is performed on the test area with powers of 15 levels from the minimum to the maximum power. Thereafter, the peak value (P) and the bottom value (B) of the envelop of each RF (high-frequency) signal reproduced from the test area are detected. Then, the write power of a level at which it is determined that a value β obtained from $\beta=(P+B)/(P-B)$ exceeds a predetermined value (for instance, 0.04) is considered as an optimum write power, and thereafter, signal recording is performed.

One test area (15 frames) in the power calibration area corresponds to approximately 1.7 rotations of the disk.

However, disk cost reduction has caused the signal recording surfaces of disks to contain deflection or eccentricity, or to suffer from unevenness of the application of signal recording surface materials. Further, multi-speed or high-speed rotations of a disk drive unit bring the rotation frequency of a disk closer to the resonance frequency of the lens actuator of an optical pickup, thus causing resonance. These causes a variation in a cycle of one rotation of the disk, thus exerting the following effects on the OPC operation for setting the optimum write power.

The center of the optical axis of the laser beam is deviated from the center of an objective lens so that the amount of the laser beam emitted from the objective lens changes, thus causing a variation in efficiency for light utilization. This is particularly noticeable if a rotational system has a large eccentricity. Further, if the signal recording surface has a large deflection, the incident angle of the laser beam varies to cause a variation in the amount of the laser beam effective for recording. That is, there has been the problem that this periodic variation prevents the optimum write power from being set with good accuracy.

DISCLOSURE OF THE INVENTION

A general object of the present invention is to provide an optical disk drive unit that can reduce the effects of the periodic variation of a rotating optical disk and set an optimum write power with good accuracy.

The above object of the present invention is achieved by an optical disk drive unit performing write power calibration which performs recording on a given test area of an optical disk by changing a write power and sets an optimum write power based on characteristic values obtained from reproduced signals from: the given test area, which optical disk drive unit includes average calculation means for dividing the given test area into a plurality of areas in angularly different positions, performing recording on the areas by changing the write power characteristic values obtained from reproduced signals from the areas in the angularly different positions, and optimum write power setting means for setting the optimum write power based on the averages of the characteristic values calculated by the average calculation means.

The above-described optical disk drive unit divides a given test area into a plurality of areas, performs recording on the areas by changing a write power equally, calculates averages of characteristic values obtained from reproduced signals from the areas, and sets an optimum write power based on the averages of the characteristic values. Therefore, with the averages of the characteristic values obtained from the areas of the optical disk which areas are in angularly different positions, the effects of the periodic variation of the optical disk can be reduced and the optimum write power can be set with good accuracy.

Additionally, the above-described optical disk drive unit may include coarsely adjusted power setting means for performing recording on a part of the given test area by coarsely changing the write power between a minimum write power and a maximum write-power and setting a coarsely adjusted power based on characteristic values obtained from reproduced signals from the part of the given test area, wherein the average calculation means performs recording on the areas by equally changing the write power finely around the coarsely adjusted power.

This optical disk drive unit performs recording on a part of the given test area by coarsely changing the write power between a minimum write power and a maximum write power, sets a coarsely adjusted power based on characteristic values obtained from reproduced signals from the part of the given test area, performs recording on the areas by finely changing the write power equally around the coarsely adjusted power, calculates averages of the characteristic values obtained from the reproduced signals from the areas, and sets an optimum write power based on the averages of the characteristic values. Therefore, the optimum write power can be set with good accuracy in the limited test area.

BRIEF DESCRIPTION OF THE DRAWINGS

Other objects, features and advantages of the present invention will become more apparent from the following detailed description when read in conjunction with the accompanying drawings.

BEST MODE FOR CARRYING OUT THE INVENTION

A description will be given, with reference to the accompanying drawings, of an embodiment of the present invention.

Figure 1:
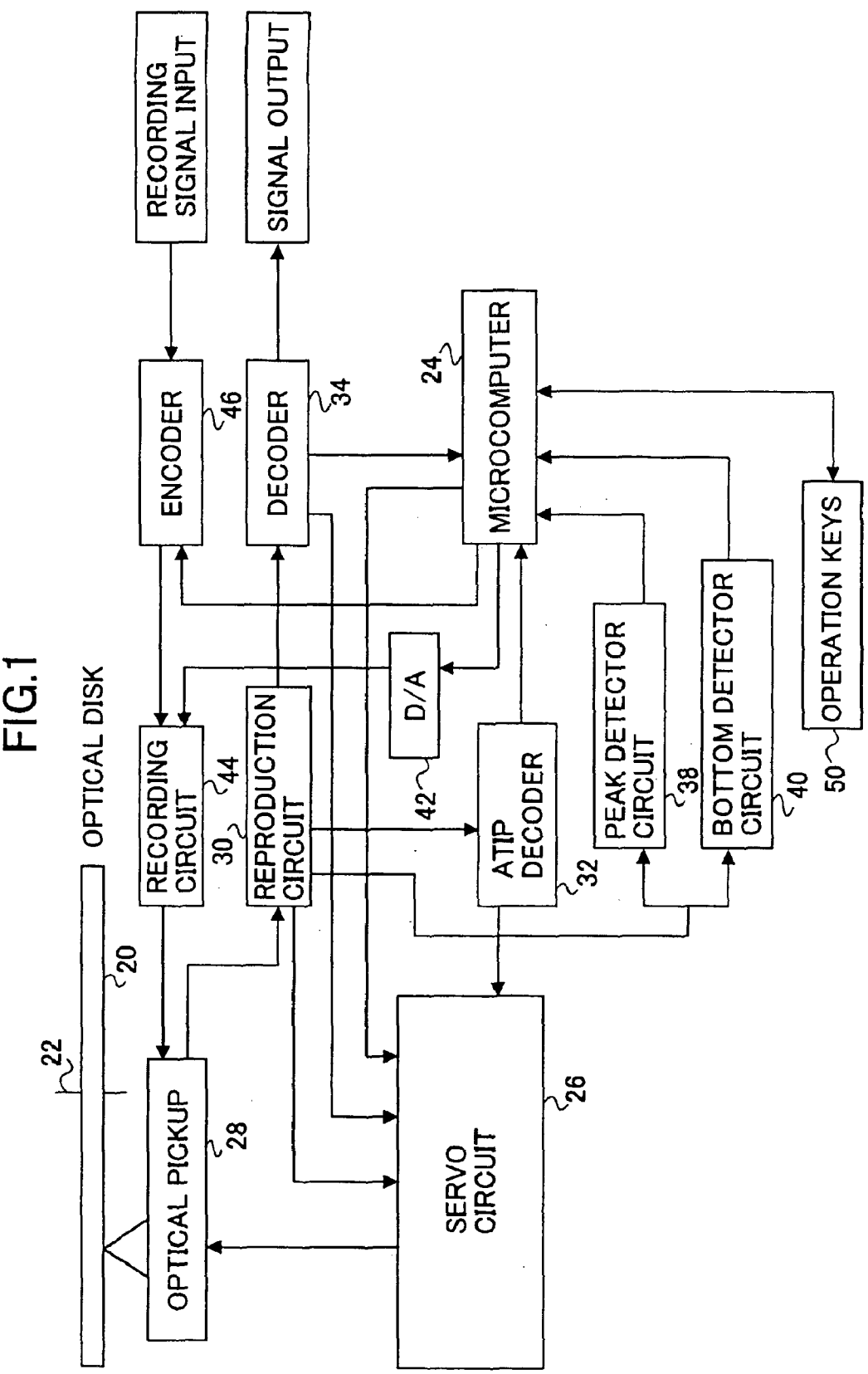
FIG. 1 is a block diagram of an embodiment of an optical disk drive unit of the present invention.

FIG. 1 is a block diagram of an embodiment of an optical disk drive unit of the present invention. In the drawing, an optical disk (a CD-R disk) 20 is actuated by a spindle motor and is rotated on a shaft 22. A microcomputer 24 supplies a command to a servo circuit 26 based on a read/write command supplied from a host computer. The servo circuit 26 performs a CLV (constant linear velocity) servo of the spindle motor, performs rotational control of the thread motor of an optical pickup 28 to move the optical pick up 28 to a desired frame of optical disk 20, and performs focus and tracking servos of the optical pickup 28.

A laser light emitted from the optical pickup 28 is reflected from the recording surface of the optical disk 20 to be detected by the optical pickup 28. A reproduced signal obtained by the optical pickup 28 is supplied to a reproduction circuit 30. The reproduced signal waveform-shaped therein is supplied to the servo circuit 26, and is simultaneously EFM-demodulated in the reproduction circuit 30 so that an ATIP signal is separated form the reproduced signal to be supplied to an ATIP decoder 32. The synchronized demodulated signal is supplied to a decoder 34 for CIRC (Cross-Interleave Reed-Solomon Code) decoding and error correction, and thereafter, is output as reproduced data.

The reproduced signal output from the reproduction circuit 30 is supplied to a peak detector circuit 38 and a bottom detector circuit 40. The peak detector circuit 38 detects the peak value (P) of a reproduced signal envelope and supplies the peak value (P) to the microcomputer 24, and the bottom detector circuit 40 detects the bottom value (B) of the reproduced signal envelope and supplies the bottom value to the microcomputer 24.

The microcomputer 24 generates a write power control signal on the basis of the peak and bottom values (P) and (B), and the write power control signal is converted into an analog signal by a D/A converter 42 to be supplied to a recording circuit 44 as a write power control voltage. An encoder 46, based on the control of the microcomputer 24, performs CIRC (Cross-Interleave Reed-Solomon Code) encoding on an input recording signal and supplies the signal to the recording circuit 44.

The recording circuit 44 EFM-modulates the signal supplied from the encoder 46 at a time of recording, and controls the modulated signal to a write power corresponding to the write power control voltage. The recording circuit 44 supplies the controlled signal to a laser diode (LD) in the optical pickup 28 to actuate the laser diode. Thereby, the laser light is projected onto the optical disk 20 for signal recording.

The microcomputer 24 stores in a built-in memory (RAM) thereof a past OPC history, that is, optimum write powers measured in the past. The history is maintained until a tray is opened and the optical disk 20 is replaced.

The microcomputer 24 stores in a built-in memory (ROM) thereof tables of values β corresponding to the type (ID number) of the optical disk 20 and recording rates (1×, 2×, 4×, 6×, and 8×), and OPC start and step powers corresponding to the recording rates (1×, 2×, 4×, 6×, and 8×). Operation inputs from operation keys 50 are supplied to the microcomputer 24.

Figure 2:
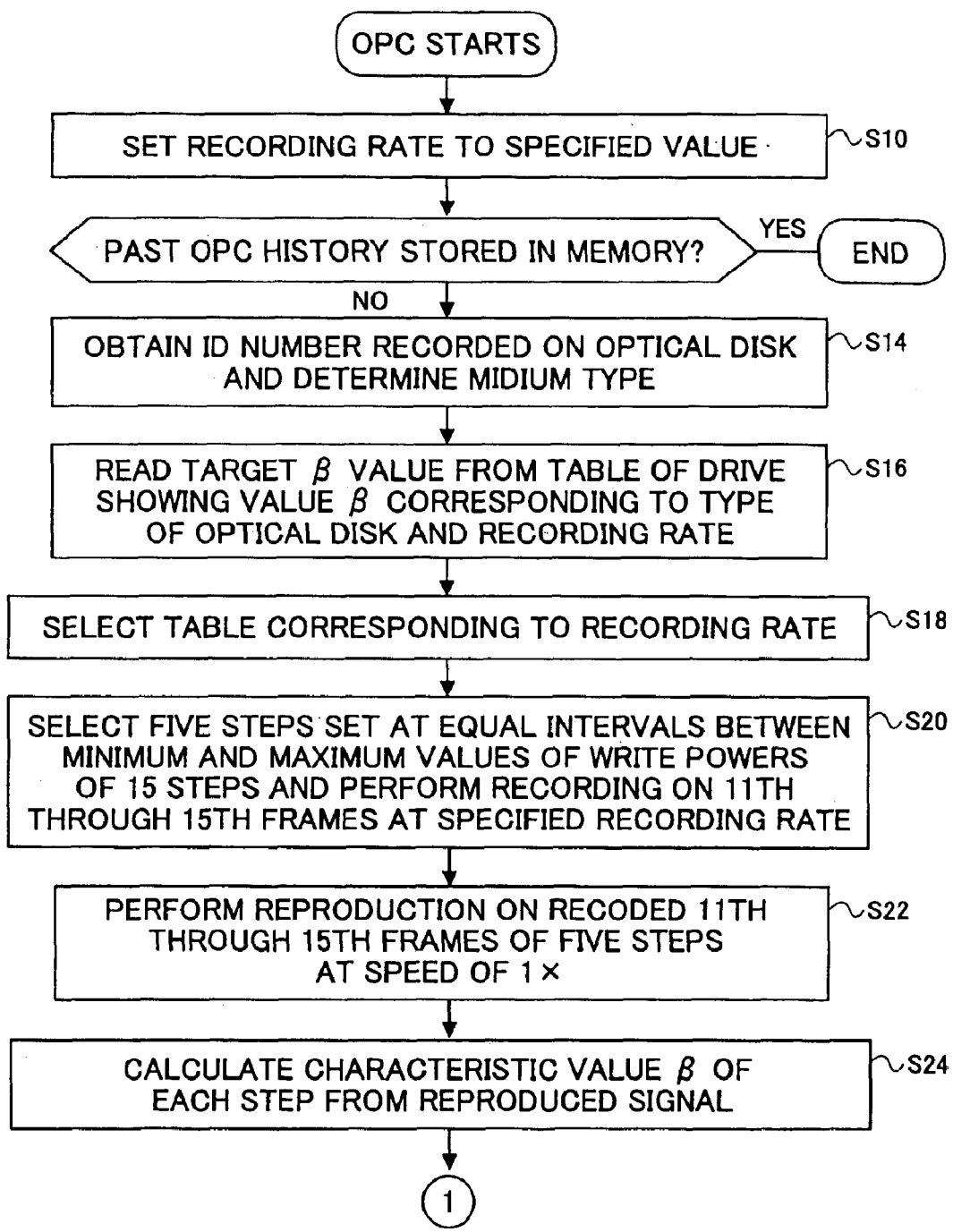
FIG. 2 is a flowchart of an OPC operation performed by a microcomputer 24.
Figure 3:
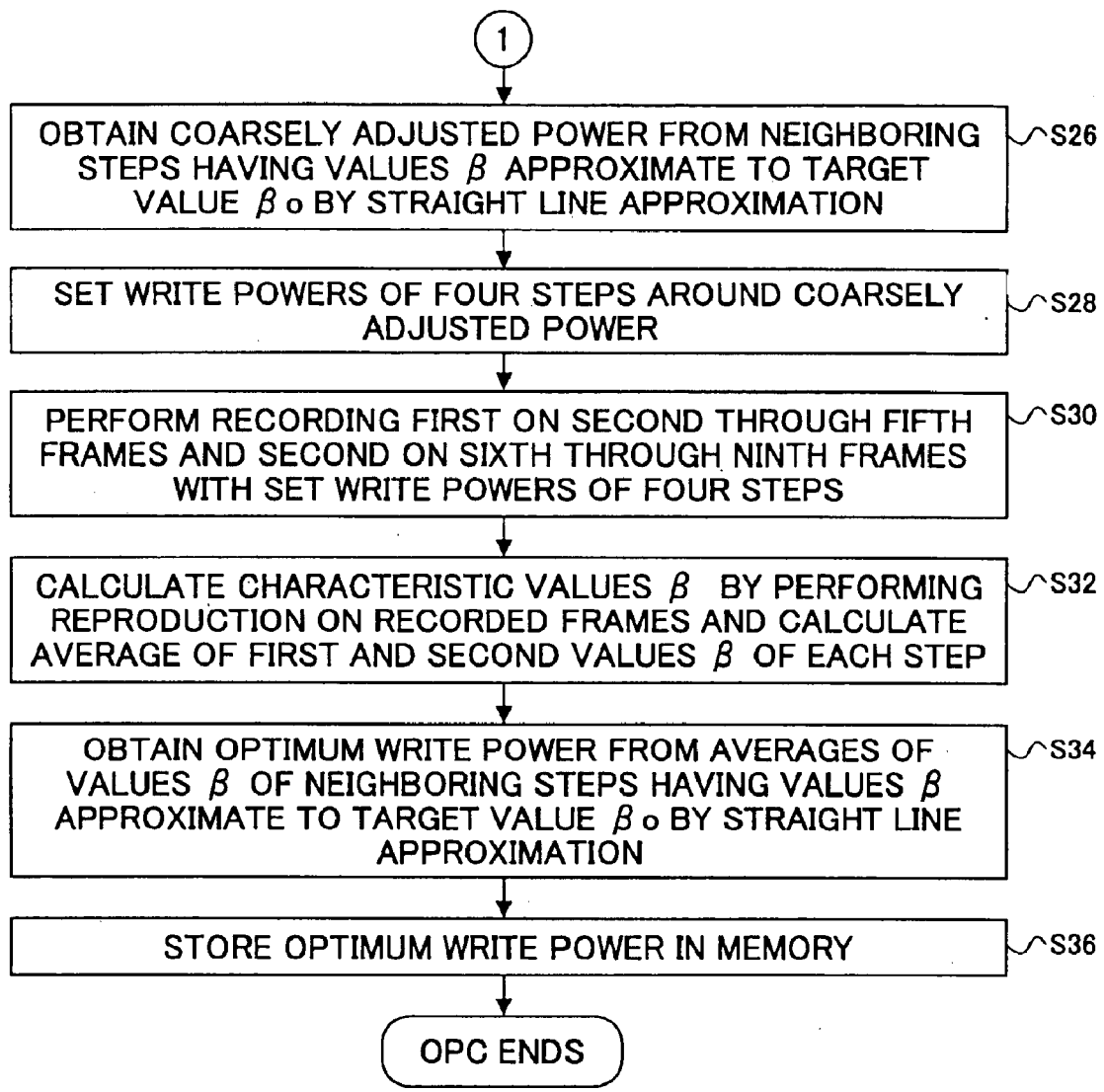
FIG. 3 is a flowchart of the OPC operation performed by a microcomputer 24.

FIGS. 2 and 3 are flowcharts of an OPC operation performed by the microcomputer 24. In step S10 in FIG. 2, a recording rate is set to a value specified by an operation from the operation keys 50. In step S12, it is determined whether the OPC history is stored in the built-in memory. If the OPC history is stored, the write power is set to that of the history and this operation ends.

If the OPC history is not stored, the operation proceeds to step S14, where an ID number recorded on the optical disk 20 is read out. Then, in step S16, a value β corresponding to the ID number and the recording rate specified from the operation keys 50 is read from a table of the built-in memory (ROM) as a target value βo. Next, in step S18, OPC start and step powers corresponding to the recording rate are read out.

Figure 4:
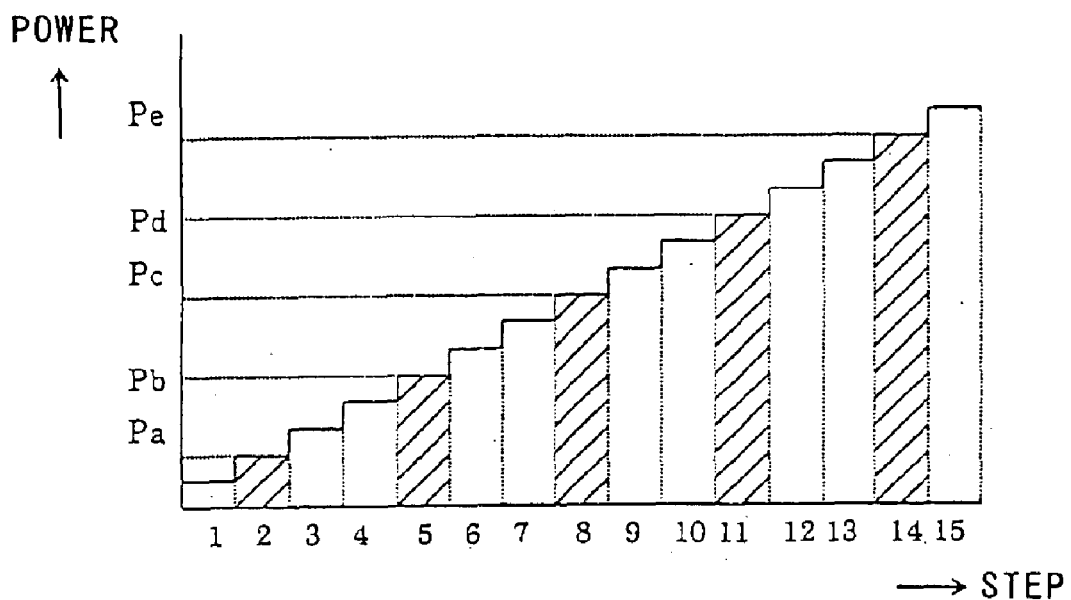
FIG. 4 is a diagram for illustrating recording of 11th through 15th frames of a test area according to the present invention.

Next, in step S20, from among powers of the first to 15th steps shown in FIG. 4, which powers are obtained by equally dividing a difference between the minimum and maximum powers, the powers of the second, fifth, eighth, 11th, and 15th steps set at equal intervals (indicated by hatching in the drawing) are selected. Then, recording is performed on the 11th through 15th frames of one test area (15 frames) of the power calibration area of the optical disk 20 by varying the power in accordance with the above-described coarse steps.

Next, in step S22, reproduction is performed on the 11th through 15th frames of the test area at the speed of 1×, and in step S24, the value β is calculated with respect to each step (frame). Here, the value β is calculated from the peak and bottom values (P) and (B) of the reproduced signal envelope based on the following expression:

$$\beta = (P+B)/(P-B)$$

Figure 5:
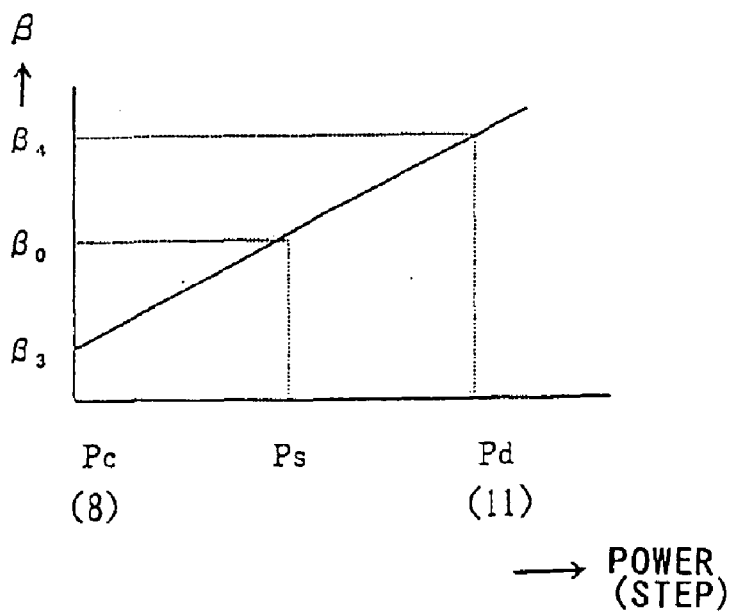
FIG. 5 is a diagram for illustrating a calculation of a coarsely adjusted power Ps for obtaining a target value βo according to the present invention.
Figure 6:
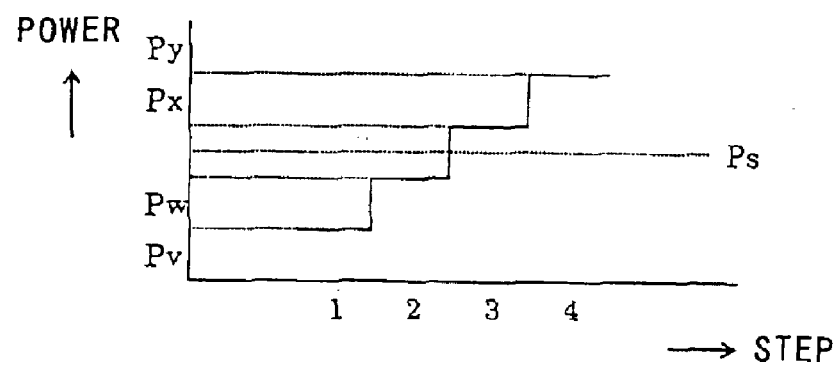
FIG. 6 is a diagram for illustrating a setting of write powers Pv, Pw, Px, and Py of four steps according to the present invention.

Next, in step S26 of FIG. 3, as shown in FIG. 5, a coarsely adjusted power Ps for obtaining the target value βo is calculated from write powers Pc and Pd of the steps (eighth and 11th steps) at which the calculated values β are next to the target value βo (for instance, 0.04). Then, in step S28; as shown in FIG. 6, with the coarsely adjusted power Ps being a center level, write powers Pv, Pw, Px, and Py of four steps set at equal intervals are set higher and lower than the coarsely adjusted power Ps.

Thereafter, in step S30, the first recording is performed on the second through fifth frames of the test area of the power calibration area of the optical disk 20 by the write powers Pv, Pw, Px, and Py of the four steps that change in accordance with the fine steps. Further, the second recording is performed on the sixth through ninth frames by the write powers Pv, Pw, Px, and Py of the four steps.

Figure 7:
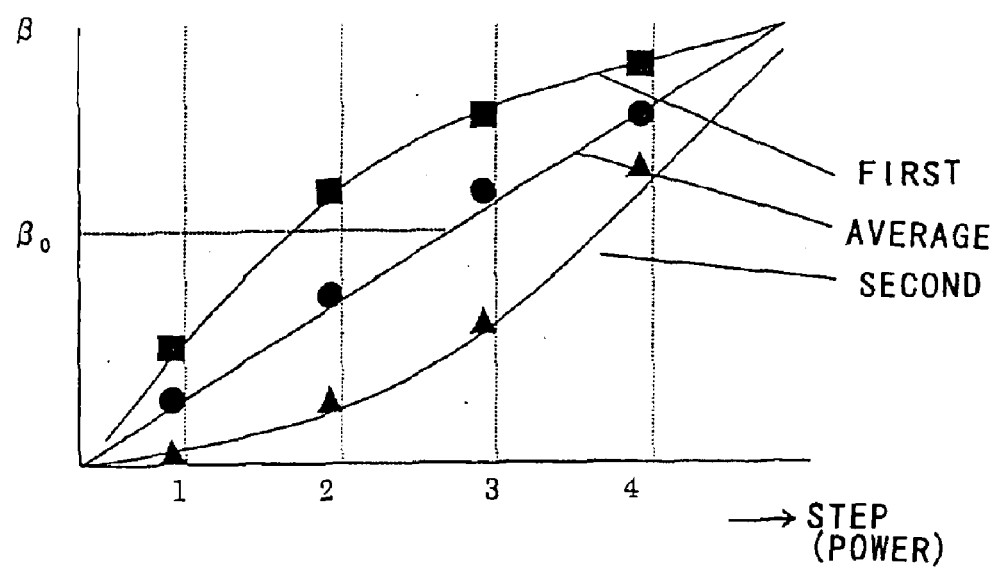
FIG. 7 is a diagram for illustrating a setting of an optimum write power for obtaining the target value βo according to the present invention.

Next, in step S32, reproduction is performed on the second through fifth frames and the sixth through ninth frames of the test area at the speed of 1×. Then, the value β is calculated with respect to each step (frame) of the first and second reproductions, and the average of the values β obtained by the same write power (each of the write powers Pv, Pw, Px, and Py) in the first and second reproductions is calculated. FIG. 7 shows a case where the value β is obtained with respect to each step (frame) of the first and second reproductions (a square indicates a value obtained in the first reproduction and a triangle indicates a value obtained in the second reproduction), and the average of the values β (indicated by a circle) obtained by the same write power in the first and second reproductions is calculated.

Next, in step S34, the optimum write power for obtaining the target value βo is obtained from the position thereof on a straight (or curved) line connecting the averages of the values β. Then, this optimum write power is stored in the built-in memory as an OPC history and the operation ends.

Since one test area (15 frames) of the power calibration area corresponds to approximately 1.7 disk rotations, the second through fifth frames and the sixth through ninth frames each correspond to an approximately 0.5 disk rotation. That is, recording for the approximately 0.5 disk rotation is performed twice with the write powers Pv, Pw, Px, and Py of the four steps, and the optimum write power is obtained from the reproduction results of the recording. Therefore, the optimum write power can be set with good accuracy even if a periodic variation is caused in the amount of the laser beam effective for recording due to deflection or eccentricity of the signal recording surface of the disk, unevenness of the application of signal recording surface materials, or resonance of the lens actuator of the optical pickup. For instance, a variation in optimum write powers obtained by a conventional OPC operation is 11%, while a variation in optimum write powers obtained by the OPC operation of this embodiment is improved to 3%.

The write power is coarsely changed between the minimum and maximum powers to perform recording on a part of a given test area, and the coarsely adjusted power is set based on characteristic values obtained from signals reproduced from the part of the given test area. Thereafter, the write power is finely changed around the coarsely adjusted power to perform recording on a plurality of areas. Then, the optimum write power is set based on the averages of a plurality of characteristic values obtained from signals reproduced from the areas. Therefore, the optimum write power can be set with good accuracy in a limited test area.

In the above-described embodiment, the CD-R disk that is a write-once optical disk is employed for description. However, the present invention is not limited to the above-described embodiment, but is also applicable to any optical disk including an erasable optical disk as far as recording power calibration is performed thereon. In the case of the erasable optical disk, a modulation degree m (together with a target value mo) is employed instead of the value β (and the target value βo) employed in the CD-R disk. The modulation degree m, which is an index indicating the magnitude of the amplitude of the reproduced RF signal of a test signal recorded in each frame of a test area, is shown by the following expression:

$$m = I11/Itop$$

where I11 is the amplitude of a reproduced RF signal based on pits and lands (regions between pits) of 11T (a signal including a direct current component), that is, a difference between the peak and bottom values (P) and (B), and Itop is the mirror reflection level of the lands, that is, a difference between the peak value (P) and a no-signal level. The modulation degree m varies in accordance with the write power. In obtaining the value β, a signal obtained by extracting an alternating current component from the reproduced RF signal is employed.

Here, in the case of a low write power, the amplitude of the reproduced RF signal is small so that the modulation degree m is small. As the write power Pw increases, the amplitude of the reproduced RF signal increases so that the modulation degree increases. Each test signal is an EFM-modulated signal formed of a pulse train having a time width three to eleven times a reference time width T (which is 230 nsec per cycle of a frequency of 4.32 MHz at a normal rate (1×)).

Further, in the above-described embodiment, the OPC start and step powers are read out from a table of the built-in memory (ROM) of the drive unit in setting the coarsely adjusted power, and powers of five steps are selected at coarse intervals from among powers of fifteen steps between the minimum and maximum powers. However, the coarsely adjusted power may be calculated by obtaining a recommended write power from the ATIP information of an optical disk and performing recording with write powers of five steps coarsely set at equal intervals above and below the recommended write power serving as a center level. As the recommended write power of the ATIP information, a value corresponding to 1× speed recording is recorded, and generally, a write power for X× speed recording is approximately $\sqrt{X}$ times the recommended write power.

Steps S30 and S32 correspond to average value calculation means, steps S34 and S36 correspond to optimum write power setting means, and steps S20 through S28 correspond to coarsely adjusted power setting means claimed in claims.

What is claimed is:

1. An optical disk drive unit performing write power calibration which performs recording on a given test area of an optical disk by changing a write power and sets an optimum write power level based on characteristic values obtained from reproduced signals from the given test area, the optical disk drive unit comprising:

an average calculation part configured to divide the given test area into first and second areas, the first area including a plurality of first regions and the second area including a plurality of second regions that are in positions substantially 180 degrees angularly different from positions of the first regions perform recording on the first areas at a plurality of write power levels and on the second area at the plurality of write power levels so that the recording is performed on each of the first region and the corresponding second region in the position substantially 180 degrees angularly different from the position of the first region at the same write power level, and with respect to each of the plurality of write power levels, calculate an averages of characteristic values obtained from reproduced signals from the first and second regions on which the recording is performed at the write power level; and an optimum write power setting part configured to set the optimum write power level based on the averages of the characteristic values calculated with respect to the plurality of write power levels by said average calculation part.

2. The optical disk drive unit as claimed in claim 1, comprising a coarsely adjusted power setting part configured to perform recording on a part of the given test area by coarsely changing the write power between a minimum write power level and a maximum write power level and setting a coarsely adjusted power level based on characteristic values obtained from reproduced signals from the part of the given test area, wherein said average calculation part performs recording on the first and second areas by equally changing the write power finely around the coarsely adjusted power.

3. The optical disk drive unit as claimed in claim 2, wherein said average calculation part divides into the first and second areas the given test area except the part thereof on which said coarsely adjusted power setting part performs the recording, and performs the recording on each of the first and second areas by changing the write power equally.

4. The optical disk drive unit as claimed in claim 3, wherein;

said coarsely adjusted power setting part performs th recording by coarsely changing the write power in five steps set at equal intervals between the minimum and maximum powers levels; and said average calculation part performs the recording on each of the first and second areas by finely changing the write power in four steps set at equal intervals around the coarsely adjusted power.

5. The optical disk drive unit as claimed in claim 1, wherein the given test area is included in a power calibration area located in an innermost part of the optical disk.

6. The optical disk drive unit as claimed in claim 1, wherein each of the characteristic values is a value obtained by dividing a sum of peak and bottom values of a reproduced signal envelope by a difference between the peak and bottom values.

7. The optical disk drive unit as claimed in claim 1, wherein each of the characteristic values is a value obtained by dividing a difference between peak and bottom values of a corresponding one of the reproduced signals by a difference between the peak value and a no-signal level of the corresponding one of the reproduced signals.

8. The optical disk drive unit as claimed in claim 2, wherein the minimum and maximum powers levels are set based on a type of the opt cal disk and a recording rate.

9. The optical disk drive unit as claimed in claim 1, wherein the write power is set as the optimum write power level at one of the characteristic values obtained from the reproduced signals from the given test area, the on a of the characteristic values being closest to a target characteristic value.

10. The optical disk drive unit as claimed in claim 8, wherein the target characteristic value is set based on a type of the optical disk and a recording rate.

* * * * *